US008637615B2

(12) United States Patent
Li et al.

(10) Patent No.: US 8,637,615 B2
(45) Date of Patent: Jan. 28, 2014

(54) METHODS FOR MAKING POLYOLEFIN PRODUCTS HAVING DIFFERENT SHEAR THINNING PROPERTIES AND HAZE

(75) Inventors: Dongming Li, Houston, TX (US); Ching-Tai Lue, Sugar Land, TX (US); Chi-I Kuo, Humble, TX (US); Mark G. Goode, Hurricane, WV (US); Stefan B. Ohlsson, Keerbergen (BE)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/515,418

(22) PCT Filed: Nov. 16, 2010

(86) PCT No.: PCT/US2010/056786
§ 371 (c)(1),
(2), (4) Date: Jun. 12, 2012

(87) PCT Pub. No.: WO2011/075258
PCT Pub. Date: Jun. 23, 2011

(65) Prior Publication Data
US 2012/0252994 A1    Oct. 4, 2012

Related U.S. Application Data

(60) Provisional application No. 61/288,023, filed on Dec. 18, 2009.

(51) Int. Cl.
*C08F 2/00* (2006.01)
*C08F 4/6592* (2006.01)

(52) U.S. Cl.
USPC ............ 526/73; 526/160; 526/165; 526/348; 526/943

(58) Field of Classification Search
USPC ........................... 526/73, 160, 165, 348, 943
See application file for complete search history.

(56) References Cited

U.S. PATENT DOCUMENTS

2004/0063871 A1    4/2004  Parrish et al.

FOREIGN PATENT DOCUMENTS

| EP | 1669372 | 7/2008 |
|----|---------|--------|
| WO | WO 00/37511 A2 | 6/2000 |
| WO | WO 00/68279 | 11/2000 |
| WO | WO 01/49751 | 7/2001 |

OTHER PUBLICATIONS

ASTM Designation: D 1003-07—Standard Test Method for Haze and Luminous Transmittance of Transparent Plastics.

*Primary Examiner* — Caixia Lu
(74) *Attorney, Agent, or Firm* — Jennifer A. Schmidt; Kristina Leavitt

(57) ABSTRACT

Provided is a method for making a polyolefin comprising contacting one or more olefins in a reactor containing a catalyst; polymerizing the one or more olefins to produce an olefin polymer characterized by a first melt flow ratio (MFR) and a first haze; and altering the reaction temperature in the reactor to shift the first MFR to a MFR that is different than the first MFR and to shift the first haze to a haze that is different than the first haze.

15 Claims, No Drawings

METHODS FOR MAKING POLYOLEFIN PRODUCTS HAVING DIFFERENT SHEAR THINNING PROPERTIES AND HAZE

CROSS REFERENCE TO RELATED APPLICATION

This application is a National Stage application under 35 U.S.C. §371 of International Application No. PCT/US2010/056786, filed Nov. 16, 2010, that claims the benefit of U.S. Provisional Patent Application Ser. No. 61/288,023, filed Dec. 18, 2009, the disclosures of which are incorporated by reference in their entirety.

FIELD OF THE INVENTION

Disclosed herein are methods of polyolefin production; and more particularly, methods for controlling product properties during production of polyolefins.

BACKGROUND

In the gas phase process for production of polyolefins such as polyethylene, a gaseous alkene (e.g., ethylene), hydrogen, co-monomer and other raw materials are converted to solid polyolefin product. Generally, gas phase reactors include a fluidized bed reactor, a compressor, and a cooler (heat exchanger). The reaction is maintained in a two-phase fluidized bed of granular polyethylene and gaseous reactants by the fluidizing gas which is passed through a distributor plate near the bottom of the reactor vessel. Catalyst is injected into the fluidized bed. Heat of reaction is transferred to the circulating gas stream. This gas stream is compressed and cooled in the external recycle line and then is reintroduced into the bottom of the reactor where it passes through a distributor plate. Make-up feedstreams are added to maintain the desired reactant concentrations.

Products generally have similar properties based on the process conditions and additives to the process system. One such property of a polyolefin is shear thinning. Shear thinning can be defined as a property of substances where the viscosity of the substance decreases in response to an increasing rate of shear to the substance. Melt flow ratio (MFR) is a ratio of two different melt flow index measurements, and is used to quantify the shear-thinning of the polymer. As is well known, melt flow index measurements measure the rate of extrusion of thermoplastics through an orifice at a prescribed temperature and load, and are often used as a means to discern molecular weight of the overall polymer.

Typically, to create products with different properties from a reactor, very different additives and/or process conditions must be used. For example, temperatures, pressures, humidity, etc., may be controlled and tuned to different levels to create a particularly desired product.

However, altering the process conditions, sometimes only by a small percentage, can have a very negative effect on the efficiency of the process, on the yield from the process, on product properties, and may even ruin the desired product rendering the process ineffective. Accordingly, it is generally preferred to operate continuously under an unchanging set of operation conditions.

What is therefore needed is a way to produce polyolefins with different properties, such as shear thinning, without incurring great cost and/or downtime to the reactor.

SUMMARY

The present disclosure is broadly directed to various methods for the production of a polymer product, as well as gas phase, fluidized bed production of polyolefins such as polyethylene.

In one general embodiment, a method comprises contacting one or more olefins in a reactor containing a catalyst comprising silica-supported $(CH_2)_4Si[(CH_3)_4C_5][C_5H_4]ZrCl_2$ with methyl aluminoxane (MAO); polymerizing the one or more olefins to produce an olefin polymer characterized by a first melt flow ratio (MFR) and a first haze; and altering a reaction temperature in the reactor to shift the first MFR to a MFR that is different than the first MFR and to shift the first haze to a haze that is different than the first haze. In some embodiments, the method includes increasing the reaction temperature in the reactor to shift the first MFR to a second MFR that is lower than the first MFR and to shift the first haze to a second haze that is higher than the first haze. In other embodiments, the method includes decreasing the reaction temperature, to shift the first MFR to a third MFR that is higher than the first MFR and to shift the first haze to a third haze that is lower than the first haze.

In yet another general embodiment, a method includes contacting one or more olefins in a reactor containing a catalyst comprising a metallocene compound with the formulation:

$$BcLaLbMQ_n,$$

where Bc is a bridge connecting ligand La and Lb, La comprises at least one of an open, acyclic, or fused ring or ring system, Lb comprises at least one of an open, acyclic, or fused ring or ring system, M is a group 4 transition metal; and Q is a leaving group. The method further includes polymerizing the one or more olefins to produce an olefin polymer characterized by a first MFR and a first haze; and altering a reaction temperature in the reactor to shift the first MFR to a MFR that is different than the first MFR and to shift the first haze to an haze that is different than the first haze. In some embodiments, if the reaction temperature is increased, the first MFR is shifted to a second MFR that is lower than the first MFR and the first haze is shifted to a second haze that is higher than the first haze. In other embodiments, if the reaction temperature is decreased, the first MFR is shifted to a third MFR that is higher than the first MFR and the first haze is shifted to a third haze that is lower than the first haze.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, structures, or the like, and as such may vary, unless otherwise specified. It is also to be understood that the terminology used herein is for the purpose of describing particular embodiments only and is not intended to be limiting.

It must also be noted that, as used in the specification and the appended claims, the singular forms "a," "an," and "the" include plural referents unless otherwise specified.

All concentrations expressed herein are concentrations in terms of parts per million by volume unless otherwise stated.

All values and ranges that are reported herein are to be considered plus/minus 10% unless otherwise stated. For example, if it is reported that 10 grams or about 10 grams of a substance should be added, that indicates that between 9 grams and 11 grams is acceptable as well.

It has been surprisingly discovered that by changing process conditions used in the production of polyolefins, particularly temperature, from typical production conditions in conjunction with a unique catalyst, polyolefins with very different properties, including shear thinning properties and haze (e.g., opacities), can be produced.

Provided herein is a method for making a polyolefin comprising contacting one or more olefins in a reactor containing a catalyst comprising silica-supported $(CH_2)_4Si[(CH_3)_4C_5][C_5H_4]ZrCl_2$ with an activator, such as methyl aluminoxane (MAO); polymerizing the one or more olefins to produce an olefin polymer characterized by a first melt flow ratio (MFR) and a first haze; and altering a reaction temperature in the reactor to shift the first MFR to a MFR that is different than the first MFR and to shift the first haze to a haze that is different than the first haze, wherein if the reaction temperature is increased, the first MFR is shifted to a second MFR that is lower than the first MFR and the first haze is shifted to a second haze that is higher than the first haze, wherein if the reaction temperature is decreased, the first MFR is shifted to a third MFR that is higher than the first MFR and the first haze is shifted to a third haze that is lower than the first haze.

In one general embodiment, a method for making a polyolefin comprises contacting one or more olefins in a reactor containing a metallocene catalyst comprising silica-supported $(CH_2)_4Si[(CH_3)_4C_5][C_5H_4]ZrCl_2$ with an activator, such as MAO; polymerizing the one or more olefins to produce an olefin polymer characterized by a first MFR and a first haze; and increasing a reaction temperature in the reactor to shift the first MFR to a second MFR that is lower than the first MFR and to shift the first haze to a second haze that is higher than the first haze.

In another general embodiment, a method for making a polyolefin comprises contacting one or more olefins in a reactor containing a metallocene catalyst comprising silica-supported $(CH_2)_4Si[(CH_3)_4C_5][C_5H_4]ZrCl_2$ with an activator, such as MAO; polymerizing the one or more olefins to produce an olefin polymer characterized by a second MFR and a second haze; and reducing a reaction temperature in the reactor to shift the second MFR to a first MFR that is higher than the second MFR and to shift the second haze to a first haze that is lower than the first haze.

Also disclosed herein is a method for making a polyolefin includes contacting one or more olefins in a reactor containing a catalyst comprising a metallocene compound with the formulation:

$$BcLaLbMQ_n,$$

where Bc is a bridge connecting ligand La and Lb, La comprises at least one of an open, acyclic, or fused ring or ring system, Lb comprises at least one of an open, acyclic, or fused ring or ring system, M is a group 4 transition metal; and Q is a leaving group. The method further includes polymerizing the one or more olefins to produce an olefin polymer characterized by a first MFR and a first haze; and altering a reaction temperature in the reactor to shift the first MFR to a MFR that is different than the first MFR and to shift the first haze to an haze that is different than the first haze, wherein if the reaction temperature is increased, the first MFR is shifted to a second MFR that is lower than the first MFR and the first haze is shifted to a second haze that is higher than the first haze, wherein if the reaction temperature is decreased, the first MFR is shifted to a third MFR that is higher than the first MFR and the first haze is shifted to a third haze that is lower than the first haze.

It has been surprisingly found that the MFR and haze of a polymer formed using the aforementioned catalysts can be shifted by altering the reaction temperature. Intuitively, only the rate of reaction should have changed, e.g., lower reaction temperature means lower production rate. However, the unexpected and dramatic effect of temperature change on both haze and MFR allows for creation of new polymers. Moreover, polymers having different MFRs and haze can be made sequentially without requiring reactor shutdown by changing the reaction conditions as set forth herein. It is presently unknown whether one could expect similar results from other catalysts. However, the lack of reporting of the novel effects disclosed herein infers that such effects would not be expected.

Using the methods and systems as described herein results in reliable, commercially useful and cost effective continuous polyolefin production. Further, using the methodology presented herein results in polymers with greatly different shear thinning properties and/or haze.

The methods described herein may be useful in any reaction process, including polymerization process, solution, slurry, and high pressure processes. For example, the disclosure may be applicable to gas phase polyolefin production, and the broad concepts and teachings herein may also have applicability to many types of processes, including but not limited to, gas phase, gas/solid phase, liquid/solid phase, gas/liquid phase, and gas/liquid/solid phase catalyst reactor systems including polymerized catalyst reactor systems; gas phase, gas/solid phase, liquid/solid phase, gas/liquid phase, and gas/liquid/solid phase batch charge preparation systems.

Fluidized Bed Polymerization Reactor Systems

Gas phase polymerization reactions may be carried out in fluidized bed polymerization reactors, and can also be formed in stirred or paddle-type reactor systems (e.g., stirred bed systems) which include solids in a gaseous environment. While the following discussion will feature fluidized bed systems, it is to be understood that the general concepts, which are discussed relevant to the preferred fluidized bed systems, may also be adaptable to the stirred or paddle-type reactor systems as well.

Embodiments for producing polyolefin polymer disclosed herein may also employ a gas phase polymerization process utilizing a fluidized bed reactor. This type reactor, and means for operating the reactor, are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

Other gas phase processes contemplated by the process disclosed herein include series or multistage polymerization processes. Also gas phase processes contemplated by process disclosed herein include those described in U.S. Pat. Nos. 5,627,242, 5,665,818 and 5,677,375, and European publications EP-A-0 794 200 EP-B1-0 649 992, EP-A-0 802 202 and EP-B-634 421.

In general, the polymerization process may be a continuous gas phase process, such as a fluid bed process. A fluid bed reactor for use in the process typically has a reaction zone and a so-called velocity reduction zone (disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In some embodiments, antistatic agents and/or continuity additives may be added to the fluidized bed polymerization reactor system during start-up. A continuity additive may be a compound that improves the operation of the reactor by reducing or eliminating the formation of fused polymer agglomerates and/or decreasing the magnitude of static electricity or changes polarity and may be added in situ to the reactor system via an appropriate mechanism such as feed line. Such compounds may alternatively be added to the catalyst prior to its introduction to the reactor and/or mixed with the catalyst as it is introduced to the reactor. Examples of continuity additives can be found in US Patent Application Pub. Nos. US20050148742A1 and US20070073012A1.

In other embodiments, no antistatic agents and/or continuity additives are added to the fluidized bed polymerization reactor system during start-up.

The methods disclosed herein are useful for forming polyolefins such as polyethylene, polypropylene, etc. Process conditions, raw materials, catalysts, etc., for forming various polyolefins and other reaction products are found in the references incorporated herein. Illustrative process conditions for polymerization reactions in general are listed below to provide general guidance.

The reaction vessel, for example, has an inner diameter of at least about 6 inches in the region where the fluid bed resides, and is generally greater than about 8 feet on the industrial-scale, and can exceed 15 or 17 feet.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C. In one approach, the reactor temperature is less than about 40° C., 30° C., more preferably less than about 20° C., and even more preferably less than about 15° C. below the melting point of the polyolefin being produced. The process can run at even higher temperatures, e.g., less than about 10° C. or 5° C. below the melting point of the polyolefin being produced. Polyethylene, for example, has a melting point in the range of approximately 125° C. to 130° C. In another example, metallocene based polymers, possibly including silica-supported $(CH_2)_4Si[(CH_3)_4C_5][C_5H_4]ZrCl_2$ with MAO, may have melting points much lower, possibly about 100° C. to 105° C.

The overall temperature in a gas phase process typically varies from about 30° C. to about 125° C. In one approach, the temperature at the point of highest temperature in the reactor system is less than about 30° C., more preferably less than about 20° C., and even more preferably less than about 15° C. below the melting point of the polyolefin being produced.

In some embodiments, a single reactor gasp phase process is used. Other gas phase processes contemplated include series or multistage polymerization processes. Also gas phase processes contemplated include those described in U.S. Pat. Nos. 5,627,242, 5,665,818 and 5,677,375, and European publications EP-A-0 794 200, EP-B1-0 649 992, EP-A-0 802 202, and EP-B-634 421.

In any of the embodiments described herein, the gas phase process may be operated in a condensed mode, where an inert condensable fluid is introduced to the process to increase the cooling capacity of the reactor system. These inert condensable fluids are referred to as induced condensing agents or ICA's. For further details of a condensed mode processes see U.S. Pat. Nos. 5,342,749 and 5,436,304.

In an embodiment, the industrial-scale reactor utilized in embodiments of the process disclosed herein is capable of producing greater than 500 lbs of polymer per hour (227 Kg/hr) to about 300,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Raw Materials And Polymer Products

The term "polymer" as used herein refers to a macromolecular compound prepared by polymerizing monomers of the same or a different type. A polymer refers to homopolymers, copolymers, terpolymers, interpolymers, and so on. The term "interpolymer" used herein refers to polymers prepared by the polymerization of at least two types of monomers or comonomers. It includes, but is not limited to, copolymers (which usually refers to polymers prepared from two different monomers or comonomers), terpolymers (which usually refers to polymers prepared from three different types of monomers or comonomers), and tetrapolymers (which usually refers to polymers prepared from four different types of monomers or comonomers), and the like. The term "monomer" or "comonomer" refers to any compound with a polymerizable moiety which is added to a reactor in order to produce a polymer. The term "polyolefin" refers to any polymer containing an olefinic monomer.

The polymers may be produced from monomers selected from ethylene, propylene, 1-butene, 1-hexene, 1-pentene, 4-methyl-1-pentene, 1-octene, 1-decene, vinyl-cyclohexene, styrene, ethylidene norbornene, norbornadiene, 1,3-butadiene, 1,5-hexadiene, 1,7-octadiene, 1,9-decadiene, or a combination thereof. The polymers may be homopolymers of ethylene or copolymers of ethylene with one or more $C_3$-$C_{20}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene copolymer preferably has at least one other alpha-olefin comonomer having at least four carbon atoms in an amount of at least 1 percent by weight of the polymer. Accordingly, ethylene/propylene copolymers are possible.

The bulk material can include relatively pure gaseous elements (e.g., gaseous $N_2$, gaseous $H_2$, gaseous $O_2$). Other components can include relatively pure liquid, solid, or gaseous compounds (e.g., liquid or solid catalyst, gaseous monomer, air). The various systems of embodiments disclosed herein can also include single-phase or multi-phase mixtures of gases, solids and/or liquids, including for example: two-phase mixtures of solids and gases (e.g., fluidized bed systems), mixtures of gasses with a single type of particle, mixtures of gasses with different types of particles (e.g., polymer and catalyst particles); and/or three-phase mixtures of gasses, liquids and solids (e.g., fluidized bed with liquid catalyst being added).

Operating Conditions

Polymerization conditions generally refer to one or more of temperature, pressure, monomer content (including comonomer concentration), catalyst concentration, cocatalyst concentration, activator concentration, etc., that influence the molecular weight and other characteristics of the polymer produced.

Specific to embodiments disclosed herein, it has been surprisingly found that properties of a polymer, such as MFR and haze, formed using the metallocene catalyst comprising $(CH_2)_4Si[(CH_3)_4C_5][C_5H_4]ZrCl_2$ with an activator, such as MAO, can be shifted by altering the reaction temperature. The chemical structure of the metallocene catalyst comprising $(CH_2)_4Si[(CH_3)_4C_5][C_5H_4]ZrCl_2$ is shown below, according to one embodiment.

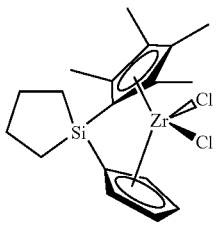

One would expect similar results from a catalyst comprising a metallocene compound with the formulation:

BcLaLbMQ$_n$, where Bc is a bridge, preferably cyclic bridge, connecting ligand La and Lb, La comprises at least one of an open, acyclic, or fused ring or ring system, Lb comprises at least one of an open, acyclic, or fused ring or ring system, M is a group 4 transition metal; and Q is a leaving group. Particularly preferred leaving groups include hydrogen, a halogen, a hydrocarbyl, a substituted hydrocarbyl, a hetrohydrocarbyl and a substituted hetrohydrocarbyl.

In some embodiments, Bc is $(CH_2)_nY$, where Y is an atom from Group 15.

In some embodiments, La and/or Lb are selected from a group consisting of unsubstituted or substituted cyclopentadienyl ligands or cyclopentadienyl-type ligands, heteroatom substituted and/or heteroatom containing cyclopentadienyl-type ligands.

In some embodiments, Q is selected from a group consisting of hydrogen, halogen, a hydrocarbyl, a substituted hydrocarbyl, a hetrohydrocarbyl and a substituted hetrohydrocarbyl.

The catalyst may also include an activator. The term "activator" is defined to be any compound or component or method which can activate any of the bulky ligand metallocene-type catalyst compound as described above. Illustrative activators include an organoaluminoxane compound or organic aluminum compound and/or a hydrocarbyl boron compound. An activator-support may include a chemical treated solid oxide, a layered mineral, and/or an ion-exchangeable material.

In some embodiments, aluminoxane and/or modified aluminoxane and/or aluminum alkyls may be used as an activator. Tri(n-butyl)ammonium tetrakis(petafluorophenyl)boron or a trisperfluorophenyl boron metalloid precursor that would ionize the neutral metallocene compound may also be used.

The catalyst may be supported by substrates known in the art including silica, a metal oxide, a metal halide and/or a polymeric material. Suitable activators and support are described in U.S. Patent Application Publication No. 2008/0045676.

In a preferred embodiment, the catalyst includes a silica-supported $(CH_2)_4Si[(CH_3)_4C_5][C_5H_4]ZrCl_2$ with MAO.

In some embodiments, the metallocene catalyst may be formed by combining a methyl aluminoxane-metallocene solution with a silica-toluene slurry to form a mixture. The mixture may be heated, and the mixture may be dried to form the metallocene catalyst.

In the methods described herein, one or more olefinic monomers are polymerized to produce an olefin polymer characterized by a first MFR and a first haze. As previously described, the MFR may generally be used as an indicator of the shear thinning property of a material.

Haze may be described as the degree to which visible light is blocked by the olefin polymer from passing through. The higher the haze, the more visible light is blocked by the olefin polymer from passing through, the lower the haze, the less visible light is blocked by the olefin polymer from passing through. According to ASTM D-1003-07e1, light that is scattered upon passing through a film or sheet of a material can produce a hazy or smoky field when objects are viewed through the material. Another effect can be veiling glare, as occurs in an automobile windshield when driving into the sun. Although haze measurements are made most commonly by the use of a hazemeter, a spectrophotometer may be used. The use of a spectrophotometer for haze measurement of plastics can provide valuable diagnostic data on the origin of the haze.

The MFR is the ratio of the polymers' HLMI ($I_{21}$) over the MI($I_2$), where the $I_{21}$ is the high load melt index as measured by ASTM D-1238-04C at 190° C. with 21.6 kg and where the $I_2$ is the melt index measured by ASTM D-1238-04C at 190° C. with 2.16 kg.

In the methods described herein, a reaction temperature in the reactor is altered to shift the first MFR to a MFR that is different than the first MFR, and to shift the first haze to a haze that is different than the first haze. In one approach, the first MFR and first haze are associated with a polymer produced during a reactor startup period. In another approach, the first MFR and first haze are associated with a polymer produced during a steady state period occurring after the startup period.

As used herein, the first MFR is higher than the second MFR; however, it is not so limited unless specified as such. Also, the first haze is lower than the second haze; however, it is not so limited unless specified as such.

The reaction temperature may be the temperature measured at the fluidized bed level in the reaction zone of the polymerization reactor.

In embodiments where the reaction temperature is increased, the first MFR is shifted to a second MFR that is lower than the first MFR and the first haze is shifted to a second haze that is higher than the first haze, i.e., the olefin polymer blocks more visible light from passing through.

In some embodiments, the reaction temperature may be increased sufficiently to cause the second MFR to be at least about 20% lower than the first MFR, alternatively at least about 30% lower than the first MFR, alternatively at least about 40% lower than the first MFR.

According to some embodiments, the reaction temperature may be increased sufficiently to cause the second haze to be at least twice as high as the first haze, alternatively at least three times as high, alternatively four times as high.

In embodiments where the reaction temperature is decreased, the first MFR is shifted to a third MFR that is higher than the first MFR and the first haze is shifted to a third haze that is lower than the first haze, e.g., the olefin polymer blocks less visible light from passing through.

In some embodiments, the reaction temperature may be reduced sufficiently to cause the second MFR to be at least about 20% lower than the first MFR, alternatively at least about 30% lower than the first MFR, alternatively at least about 40% lower than the first MFR.

According to some embodiments, the reaction temperature may be reduced sufficiently to cause the second haze to be at least twice as high as the first haze, alternatively at least three times as high, alternatively four times as high.

In some embodiments of the method, the olefin polymer that is produced may be polyethylene. In other embodiments, the olefin polymer may be polypropylene, or some other olefin polymer.

The methods described herein may be carried out in any environment, including those described herein, such as fluidized bed polymerization reactor systems, liquid phase reactor systems, etc. Of course, the method may include more steps, such as operating steps, finishing steps, preparation steps, etc., such that a desired polyolefin product may be produced through use of method.

According to some embodiments, in addition to affecting haze of the olefin polymer, the clarity and gloss may also be affected. The attribute of clarity of a sheet, measured by its ability to transmit image-forming light, correlates with its regular transmittance. Sensitivity to differences improves with decreasing incident beam- and receptor-angle. If the angular width of the incident beam and of the receptor aperture (as seen from the specimen position) are of the order of 0.1° or less, sheeting of commercial interest have a range of transparency of about 10% to 90% as measured by some tests.

Gloss, or specular gloss, is used primarily as a measure of the shiny appearance of films and surfaces. Precise comparisons of gloss values are generally meaningful only when they refer to the same measurement procedure and same general type of material. In particular, gloss values for transparent films should not be compared with those for opaque films (hazy films), and vice versa. Specular gloss usually varies with surface smoothness and flatness. It is sometimes used for comparative measurements of these surface properties.

Thus, in some embodiments, the clarity of the olefin polymer may be reduced (by increasing the reaction temperature sufficiently) or increased (by reducing the reaction temperature sufficiently) and/or the gloss of the olefin polymer may be reduced (by increasing the reaction temperature sufficiently) or increased (by reducing the reaction temperature sufficiently).

EXAMPLES

Catalyst Preparation: 4.5 liters of anhydrous toluene was transfer into a 1.5 gallon size stainless steel reactor. 1250 grams of nitrogen dehydrated Ineos ES757 silica, heated to 600° C., was added slowly to the toluene. The reactor temperature was raised to 100° C. under agitation from a stirrer operating at 60 rpm. In a different container, 1545 grams of 30 wt % toluene solution of methyl aluminoxane (MAO) (from Albemarle Corporation, Baton Rouge, La.) was mixed with 39.4 grams of $(CH_2)_4Si[(CH_3)_4C_5][C_5H_4]ZrCl_2$ (from Boulder Scientific, Mead, Colo.) at 100° C. for 30 minutes. The MAO-metallocene solution was added to the silica toluene slurry. The contents in the reactor were heated at 100° C. for one hour. Then, the slurry was dried under vacuum at 100° C. The final free flowing catalyst was light yellow in color, and about 1930 grams was collected.

The catalyst prepared above was used in a pilot plant fluidized bed gas phase reactor under the conditions in Table 1, to produce a ethylene-butene copolymers having the properties listed in Table 1. Runs A and B are shown using two different processing conditions.

Density was measured according to ASTM D-1505.

The melt indexes and melt flow rates was measured according to ASTM D-1238. The HLMI ($I_{21}$) was measured at 190° C. with 21.6 kg. The MI ($I_2$) was measured at 190° C. with 2.16 kg.

TABLE 1

Polymerization Conditions & Polymer Properties

|  | Run A | Run B |
| --- | --- | --- |
| Run Temperature (° C.) | 70 | 80 |
| C2 Partial Pressure (psia) | 170 | 200 |
| Residence Time (hrs) | 3.8 | 2.8 |
| Catalyst Productivity (lb/lb by Zr ICP) | 18,696 | 8,333 |
| Melt Index (dg/min) | 0.43 | 0.51 |
| Density (g/cc) | 0.922 | 0.924 |
| MFR (HLMI/MI) | 133 | 82 |

The polymer produced in Runs A and B was then film extruded. The films in Table 2 were extruded on a Gloucester line with a die gap of 45 mils, a film gauge of 2.0 mils, and a blow up ratio of 2.5. The films in Table 3 were extruded on a Macchi line with a 1.0 mm die gap, a film gauge of 50 microns, and a 2.5 blow up ratio.

Haze was measured according to ASTM D-1003-07e1.

Clarity was measured as per ASTM D1746-03 "Standard Test Method for Transparency of Plastic Sheeting" using a Zebedee CL-100 Clarity Meter. Percent clarity was calculated by measuring the intensity of the transmitted light through a specimen that is deflected less than 0.1°, dividing it by the intensity of incident light (without a specimen) and multiplying it by 100

Gloss was measured according to ASTM D2457-08 "Standard Test Method for Specular Gloss of Plastic Films and Solid Plastics."

TABLE 2

Film Properties

|  | Run A | Run B |
| --- | --- | --- |
| Extrusion Pressure - b screen (psi) | 2700 | 3320 |
| Extrusion Pressure - a screen (psi) | 1780 | 2040 |
| Dart Drop Method A (g/mil) | 47 | 65 |
| Haze (%) | 7.7 | 27.5 |

TABLE 3

| Film Properties | | |
| --- | --- | --- |
|  | Run A | Run B |
| Extrusion Pressure (Bar) | 173 | 224 |
| Extrusion Pressure (Bar) | 201 | 266 |
| Haze (%) | 5.8 | 24 |
| Clarity (%) | 70 | 4 |
| Gloss (45° angle) | 68 | 23 |

As can be seen in Tables 1, 2 and 3, surprisingly different MFR's and hazes may be obtained by varying process conditions, while using the same catalyst. For example, referring to Table 1, in Run A, the MFR was 133; however, in Run B, the MFR was 82. Thus, the MFR from Run B is about 40% less than the MFR in Run A. Referring to Table 2, the film from the polymers in Run A had a total haze of 7.7%, compared to the polymers from Run B which had a total haze of 27.5%. Thus, the haze of the film from the polymers in Run B is at least three times as high as the haze from the polymers in Run A.

Also as seen in Table 3, when comparing films from polymers of Run A to Run B, the gloss (45° angle) decreased from 68 to 23, a decrease of about 66%. Also, the clarity decreased from 70% to 4%, a decrease of about 94%.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present invention.

What is claimed is:

1. A method comprising:
   contacting one or more olefins in a reactor containing a catalyst comprising a
   metallocene compound with the formulation:

$BcLaLbMQ_n$, where Bc is a bridge connecting ligand La and Lb,
   where La comprises at least one of an open, acyclic, or fused ring or ring system,
   where Lb comprises at least one of an open, acyclic, or fused ring or ring system,
   where M is a Group 4 transition metal;
   where Q is a leaving group;
   polymerizing the one or more olefins to produce an olefin polymer characterized by a first melt flow ratio and a first haze; and
   altering a reaction temperature in the reactor to shift the first melt flow ratio ($I_{21}/I_2$) to a melt flow ratio that is different than the first melt flow ratio and to shift the first haze to a haze that is different than the first haze,
   wherein if the reaction temperature is increased, the first melt flow ratio is shifted to a second melt flow ratio that is lower than the first melt flow ratio and the first haze is shifted to a second haze that is higher than the first haze,
   wherein if the reaction temperature is decreased, the first melt flow ratio is shifted to a third melt flow ratio that is higher than the first melt flow ratio and the first haze is shifted to a third haze that is lower then the first haze,
   wherein $I_{21}$ is measured according to ASTM D-1238-04C (190° C., 21.6kg) and $I_2$ is measured according to ASTM D-1238-04C (190° C., 2.16kg).

2. The method of claim 1, wherein Bc is $(CH_2)_nY$, where Y is an atom from Group 15.

3. The method of claim 1, wherein La is selected from a group consisting of unsubstituted or substituted cyclopentadienyl ligands or cyclopentadienyl ring containing ligands.

4. The method of claim 1, wherein Lb is selected from a group consisting of unsubstituted or substituted cyclopentadienyl ligands or cyclopentadienyl ring containing ligands.

5. The method of claim 1, wherein Q is selected from a group consisting of hydrogen, halogen, a hydrocarbyl, a substituted hydrocarbyl, a heterohydrocarbyl and a substituted heterohydrocarbyl.

6. The method of claim 1, wherein the catalyst comprises silica-supported $(CH_2)_4Si[(CH_3)_4C_5][C_5H_4]ZrCl_2$.

7. The method of claim 6, wherein the catalyst comprises silica-supported $(CH_2)_4Si[(CH_3)_4C_5][C_5H_4]ZrCl_2$ with methyl aluminoxane.

8. The method of claim 7 comprising;
   polymerizing the one or more olefins to produce an olefin polymer characterized by a first melt flow ratio and a first haze; and
   increasing a reaction temperature in the reactor to shift the first melt flow ratio to a second melt flow ratio that is lower than the first melt flow ratio and to shift the first haze to a second haze that is higher than the first haze.

9. The method of claim 8, wherein the reaction temperature is increased sufficiently to cause the second melt flow ratio to be at least 20% lower than the first melt flow ratio.

10. The method of claim 8, wherein the reaction temperature is increased sufficiently to cause the second haze to be at least twice as high as the first haze.

11. The method of claim 7 comprising:
    contacting one or more olefins in a reactor containing a metallocene catalyst comprising silica-supported $(CH_2)_4Si[(CH_3)_4C_5][C_5H_4]ZrCl_2$ with methyl aluminoxane;
    polymerizing the one or more olefinic monomers to produce an olefin polymer characterized by a second melt flow ratio and a second haze; and
    reducing a reaction temperature in the reactor to shift the second melt flow ratio to a first melt flow ratio that is higher than the second melt flow ratio and to shift the second haze to a first haze that is lower than the second haze.

12. The method of claim 11, wherein the reaction temperature is reduced sufficiently to cause the second melt flow ratio to be at least 20% lower than the first melt flow ratio.

13. The method of claim 11, wherein the reaction temperature is reduced sufficiently to cause the second haze to be at least twice as high as the first haze.

14. The method of claim 1, wherein the metallocene catalyst is formed by combining a methyl aluminoxane-metallocene solution with a silica-toluene slurry to form a mixture, heating the mixture, and drying the mixture.

15. The method of claim 1, wherein the polymer is polyethylene.

* * * * *